US012561579B2

(12) United States Patent
Yuan et al.

(10) Patent No.: US 12,561,579 B2
(45) Date of Patent: Feb. 24, 2026

(54) HIERARCHAL PHENOTYPING USING GRAPHS

(71) Applicant: Deere & Company, Moline, IL (US)

(72) Inventors: Zhiqiang Yuan, San Jose, CA (US); Hong Wu, Los Altos, CA (US); Yujing Qian, Mountain View, CA (US); Francis Ebong, San Francisco, CA (US); Elliott Grant, Woodside, CA (US); Ngozi Kanu, Pleasanton, CA (US); Bodi Yuan, Sunnyvale, CA (US); Chunfeng Wen, Santa Clara, CA (US); Chen Cao, San Jose, CA (US); Yueqi Li, San Jose, CA (US)

(73) Assignee: Deere & Company, Moline, IL (US)

( * ) Notice: Subject to any disclaimer, the term of this patent is extended or adjusted under 35 U.S.C. 154(b) by 393 days.

(21) Appl. No.: 17/872,286

(22) Filed: Jul. 25, 2022

(65) Prior Publication Data

US 2024/0028915 A1 Jan. 25, 2024

(51) Int. Cl.
    *G06N 5/022*     (2023.01)
    *G06N 5/04*     (2023.01)
    (Continued)

(52) U.S. Cl.
    CPC .............. *G06N 5/022* (2013.01); *G06N 5/04* (2013.01); *G06N 20/00* (2019.01); *G06V 10/764* (2022.01); *G06V 20/188* (2022.01)

(58) Field of Classification Search
    CPC .......... G06N 5/022; G06N 5/04; G06N 20/00; G06N 3/044; G06N 3/0455; G06N 3/0464;
    (Continued)

(56) References Cited

U.S. PATENT DOCUMENTS

| | | | | |
|---|---|---|---|---|
| 11,113,525 | B1 * | 9/2021 | Li | G06N 3/045 |
| 2018/0293671 | A1 * | 10/2018 | Murr | G06Q 50/02 |

(Continued)

OTHER PUBLICATIONS

Xie et al., "Recommendation algorithm for agricultural products based on attention factor decomposer and knowledge graph" 2022 Asia Conference on Algorithms, Computing and Machine Learning (CACML). DOI 10.1109/CACML55074.2022.00100, 6 pages.

(Continued)

*Primary Examiner* — Amandeep Saini
*Assistant Examiner* — Emma Rose Goebel
(74) *Attorney, Agent, or Firm* — HANLEY, FLIGHT & ZIMMERMAN, LLC

(57) ABSTRACT

Implementations are described herein for integrating phenotyping machine learning (ML) models with an agricultural knowledge graph (AKG) to facilitate streamlined and flexible phenotypic inferences. In various implementations, the AKG may be traversed based on input including image(s) of crops growing in an agricultural plot until a destination node is reached. The AKG may include a phenotypic taxonomy of nodes representing a taxonomic hierarchy of organisms, with the destination node corresponding to a level of the phenotypic taxonomy that is commensurate in scope with the input. The phenotypic taxonomy of nodes may provide access to a corresponding taxonomy of phenotyping ML models, each trained to generate phenotypic inference(s) at a specificity that corresponds to a level of the phenotypic taxonomy. The crop image(s) may be processed using the phenotyping ML model that is accessible via the destination node to generate phenotypic inference(s) about the agricultural plot.

20 Claims, 6 Drawing Sheets

(51) Int. Cl.
    *G06N 20/00*        (2019.01)
    *G06V 10/764*      (2022.01)
    *G06V 20/10*       (2022.01)
    *G06V 20/68*       (2022.01)

(58) Field of Classification Search
    CPC ...... G06N 3/084; G06V 10/764; G06V 20/68;
             G06V 10/84; G06V 20/56; G06V 20/188;
             A01B 76/00; G06F 3/167; G06F 3/011;
                                A01G 7/00
    See application file for complete search history.

(56)             References Cited

U.S. PATENT DOCUMENTS

| | | | | |
|---|---|---|---|---|
| 2020/0273172 A1* | 8/2020 | Weldemariam | ........ | G06N 5/022 |
| 2021/0097096 A1* | 4/2021 | Osmon | ................. | G06F 40/284 |
| 2021/0209125 A1* | 7/2021 | Tokarev Sela | ...... | G06F 16/9024 |
| 2022/0101151 A1* | 3/2022 | Portisch | ............... | G06F 16/212 |
| 2023/0016157 A1* | 1/2023 | Ferreira Moreno | ......................... | |
| | | | | G06F 16/24578 |
| 2023/0252791 A1* | 8/2023 | Webb | ................... | G06V 10/776 |
| | | | | 382/159 |

OTHER PUBLICATIONS

Zhang et al., "Research and Application of Agriculture Knowledge Graph" 2021 Association for Computing Machinery. 9 pages.

Chen et al., "AgriKG: An Agricultural Knowledge Graph and Its Applications" DASFAA 2019, LNCS 11448, pp. 533-537.

Ngo et al., "OAK: Ontology-based Knowledge Map Model for Digital Agriculture" arXiv:2011.11442v1 [cs.DB], 15 pages, dated Nov. 20, 2020.

Guan et al., "Diagnosis of Fruit Tree Diseases and Pests Based on Agricultural Knowledge Graph" 2021 International Conference on Advances in Optics and Computational Sciences, Journal of Physics: Conference Series, 1865 (2021) 042052, doi: 10.1088/1742-6596/1865/4/042052, 9 pages.

Qin et al., "Agriculture Knowledge Graph Construction and Application" BDAI 2020, Journal of Physics: Conference Series, 1756(2021) 012010, doi:10.1088/1742-6596/1756/1//012010, 9 pages.

* cited by examiner

500

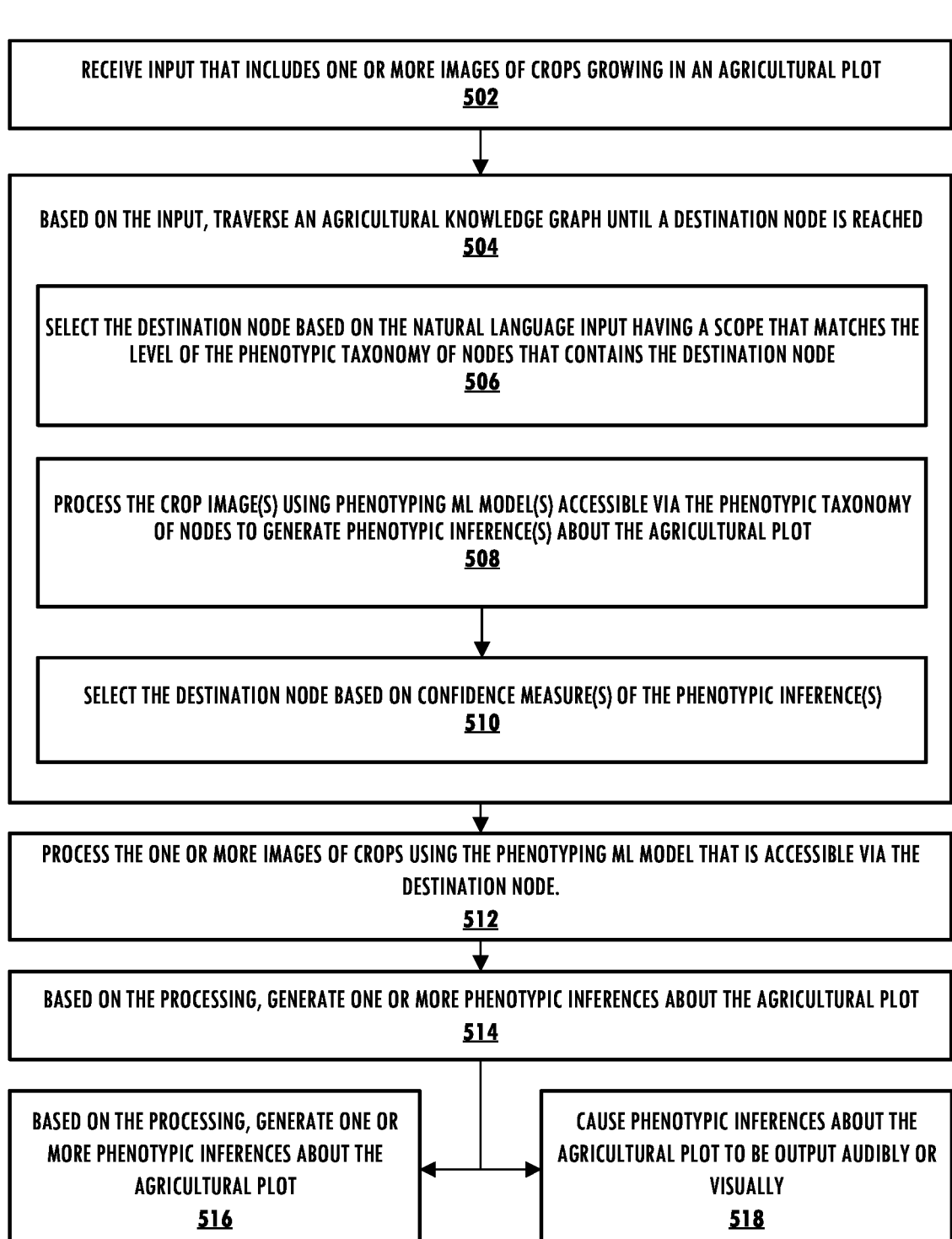

RECEIVE INPUT THAT INCLUDES ONE OR MORE IMAGES OF CROPS GROWING IN AN AGRICULTURAL PLOT
502

BASED ON THE INPUT, TRAVERSE AN AGRICULTURAL KNOWLEDGE GRAPH UNTIL A DESTINATION NODE IS REACHED
504

SELECT THE DESTINATION NODE BASED ON THE NATURAL LANGUAGE INPUT HAVING A SCOPE THAT MATCHES THE LEVEL OF THE PHENOTYPIC TAXONOMY OF NODES THAT CONTAINS THE DESTINATION NODE
506

PROCESS THE CROP IMAGE(S) USING PHENOTYPING ML MODEL(S) ACCESSIBLE VIA THE PHENOTYPIC TAXONOMY OF NODES TO GENERATE PHENOTYPIC INFERENCE(S) ABOUT THE AGRICULTURAL PLOT
508

SELECT THE DESTINATION NODE BASED ON CONFIDENCE MEASURE(S) OF THE PHENOTYPIC INFERENCE(S)
510

PROCESS THE ONE OR MORE IMAGES OF CROPS USING THE PHENOTYPING ML MODEL THAT IS ACCESSIBLE VIA THE DESTINATION NODE.
512

BASED ON THE PROCESSING, GENERATE ONE OR MORE PHENOTYPIC INFERENCES ABOUT THE AGRICULTURAL PLOT
514

BASED ON THE PROCESSING, GENERATE ONE OR MORE PHENOTYPIC INFERENCES ABOUT THE AGRICULTURAL PLOT
516

CAUSE PHENOTYPIC INFERENCES ABOUT THE AGRICULTURAL PLOT TO BE OUTPUT AUDIBLY OR VISUALLY
518

Fig. 5

HIERARCHAL PHENOTYPING USING GRAPHS

BACKGROUND

The rise of precision agriculture has enabled growers to manage their crops more efficiently, which increases crop yields and reduces waste, among other things. Autonomous vehicles such as sensor-equipped robots, as well as sensor packages mounted on conventional agricultural vehicles such as tractors, booms, etc., enable growers to gather ever-more-massive sensor data about crops than is practical with human-based sampling. Machine learning (ML) has enabled the growers to extract value from the gathered sensor data. However, while most growers have significant expertise in agriculture, they may lack expertise in data science. Consequently, growers tend to work with data scientists to implement ML pipelines that facilitate the practice of precision agriculture.

Given a grower's ever-changing needs—due to factors like crop rotation, climate change, and evolving economic conditions, to name a few—the grower may repeatedly engage with data scientists over time to implement new ML processing pipelines. Suppose a grower transitions from a first type of berry plant during a first crop cycle to a second type of berry plant during a second crop cycle. ML model(s) trained to generate phenotypic inferences about the first type of berry plant may not be scalable to the second type of berry plant. Consequently, the grower may need to update those model(s) or obtain new ML model(s). The process of training new ML model(s) or updating existing ML model(s) can be cumbersome, disruptive, and/or costly.

SUMMARY

Implementations are described herein for integrating phenotyping ML models with an agricultural knowledge graph to enable growers to obtain phenotypic inferences about heterogenous crops (e.g., different crops grown in different areas simultaneously, or across multiple crop cycles) in a streamlined and flexible manner. The resulting agricultural knowledge graph is adaptable to process inputs in various intuitive, unstructured, and/or varying forms, such as images of crops, natural language, other sensor data, etc., without requiring repeated ML model updates or replacements.

In various implementations, a method may be implemented using one or more processors and may include: receiving input that includes one or more images of crops growing in an agricultural plot; based on the input, traversing an agricultural knowledge graph until a destination node is reached, wherein: the agricultural knowledge graph includes a phenotypic taxonomy of nodes representing a taxonomic hierarchy of organisms, the destination node corresponds to a level of the phenotypic taxonomy of nodes that is commensurate in scope with the input, and the phenotypic taxonomy of nodes provide access to a corresponding taxonomy of phenotyping machine learning (ML) models, wherein each phenotyping ML model is trained to generate one or more phenotypic inferences at a level of specificity that corresponds to a level of the phenotypic taxonomy of nodes that contains the node that provides access to the phenotyping ML model; processing the one or more images of crops using the phenotyping ML model that is accessible via the destination node; and based on the processing, generating one or more phenotypic inferences about the agricultural plot.

In various implementations, the method may further include operating an autonomous vehicle in the agricultural plot in real time based on one or more of the phenotypic inferences about the agricultural plot. In various implementations, the one or more of the phenotypic inferences about the agricultural plot may include an instance count of edible plant matter. In various implementations, the destination node may point to a memory location that stores the phenotyping ML model.

In various implementations, the input may include natural language input, and the traversing may include selecting the destination node based on the natural language input having a scope that matches the level of the phenotypic taxonomy of nodes that contains the destination node. In various implementations, the selecting may be based on the natural language input identifying a taxonomic rank of the destination node.

In various implementations, the method includes: processing the one or more images of crops using one or more of the phenotyping ML models that are accessible via one or more of the phenotypic taxonomy of nodes below the destination node to generate one or more higher-specificity phenotypic inferences about the agricultural plot; determining that one or more confidence measures associated with one or more of the higher-specificity phenotypic inferences fails to satisfy a threshold; and selecting the destination node based on the determining.

In various implementations, the method includes: processing the one or more images of crops using two or more of the phenotyping ML models that are accessible via two or more of the phenotypic taxonomy of nodes above the destination node to generate lower-specificity phenotypic inferences about the agricultural plot; comparing confidence measures associated with the lower-specificity phenotypic inferences; and traversing the agricultural knowledge graph based at least in part on the comparing.

In various implementations, the input may be received from an autonomous vehicle operating in the agricultural plot, and the method further comprises pushing data indicative of one or more of the phenotypic inferences about the agricultural plot to a computing device operated by a user associated with the agricultural plot, wherein the pushing causes the computing device to surface the data.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in transitory and/or non-transitory computer-readable memory, and where the instructions are configured to enable performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 is a flowchart of an example method in accordance with various implementations described herein.

DETAILED DESCRIPTION

Figure 1:
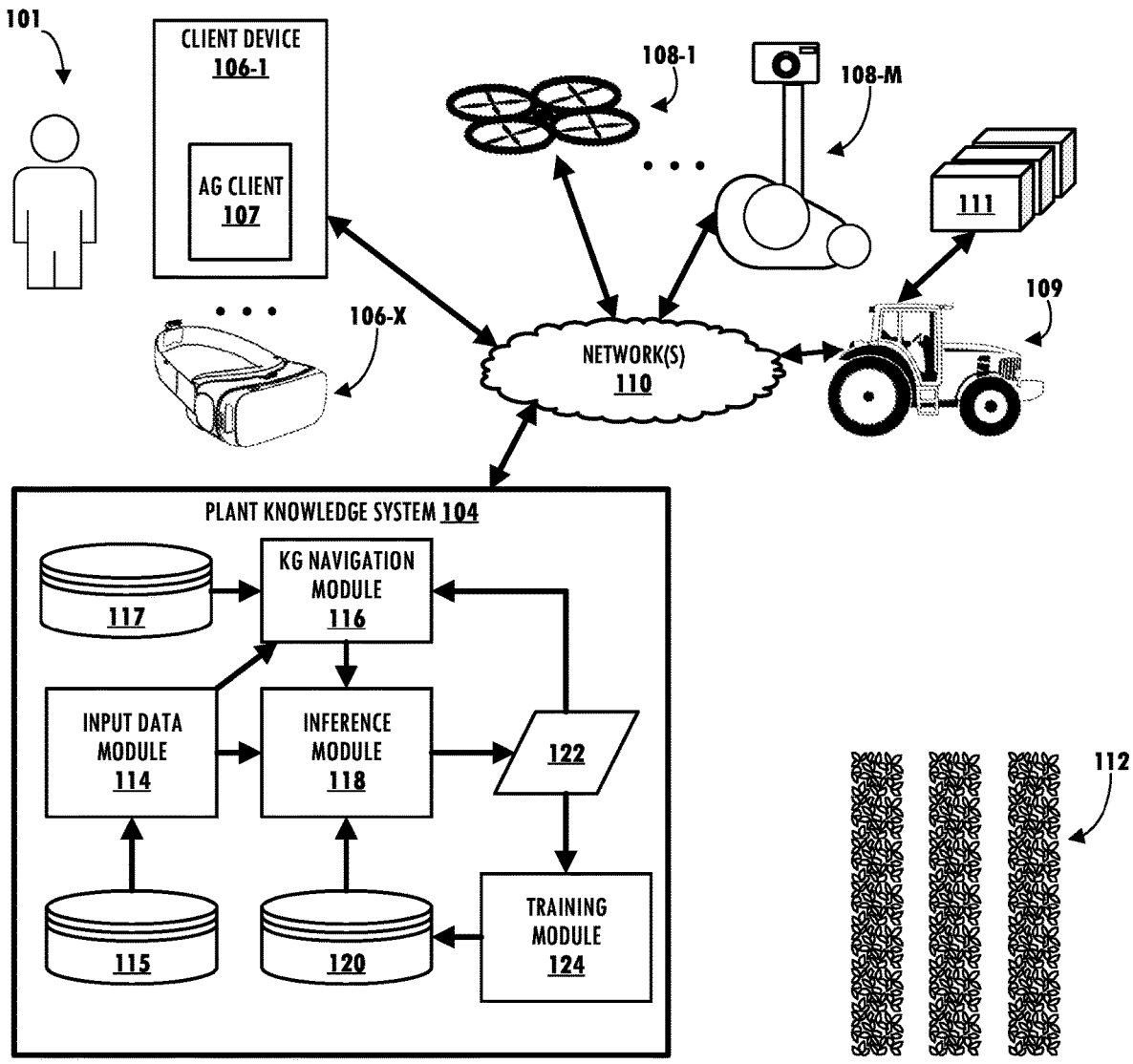
FIG. 1 schematically depicts an example environment in which selected aspects of the present disclosure may be employed in accordance with various implementations.

Implementations are described herein for integrating phenotyping ML models with an agricultural knowledge graph to enable growers to obtain phenotypic inferences about heterogenous crops (e.g., different crops grown in different areas simultaneously, or across multiple crop cycles) in a streamlined and flexible manner. The resulting agricultural knowledge graph is adaptable to process inputs in various intuitive, unstructured, and/or varying forms, such as images of crops, natural language, other sensor data, etc., without requiring repeated ML model updates or replacements.

In various implementations, the agricultural knowledge graph may include nodes representing entities and edges representing relationships between those entities. In the agricultural context, entities may include abstract concepts such as types of crops, types of disease or pests, types of farm equipment, and so forth. Entities may also include concrete instances of these abstract concepts, such as specific people, locations (e.g., individual plots or farms), or objects. In some implementations, the agricultural knowledge graph may be stored in a graph database.

In various implementations, the agricultural knowledge graph may include nodes representing a taxonomic hierarchy of organisms, which will be referred to herein as a "phenotypic taxonomy of nodes." In the agricultural context, "organisms" may primarily include crops, pests, and plant diseases. In some implementations, the phenotypic taxonomy of nodes may include multiple levels, with higher levels representing more abstract (or less specific) entities than lower levels. For example, the phenotypic taxonomy of nodes may include levels that correspond to taxonomic ranks, such as kingdom, phylum or division, class, order, family, genus, and species.

In various implementations, at least some nodes of the phenotypic taxonomy of nodes may provide access to a corresponding taxonomy of phenotyping ML models. Each phenotyping ML model may be trained so that when used to process input (e.g., images of crops, other sensor data, weather data, stewardship data, etc.), phenotypic inference(s) are generated at a level of specificity that corresponds to and/or is commensurate with a level of the phenotypic taxonomy of nodes. For instance, a node representing the *Rubus* genus may provide access to a convolutional neural network (CNN) that, when used to process an image, annotates the image with bounding boxes surrounding any detected *Rubus* berries, including raspberries, blackberries, dewberries, or salmonberries. By contrast, a node representing the *Rubus spectabilis* species may provide access to a CNN that, when used to process an image, only annotates the image with bounding boxes surrounding detected *Rubus spectabilis* berries, i.e. salmonberries.

In various implementations, the phenotypic taxonomy of nodes may be traversable to reach a destination node that corresponds to a level of the phenotypic taxonomy of nodes that is commensurate in scope with the input. Suppose a grower issues a natural language query, "give me a count of *Rubus* berries" in relation to images capturing an agricultural plot that includes *Rubus* plants. The grower's natural language query may be used to traverse the knowledge graph through nodes representing, for instance, the Plantae kingdom, the Rosales order, and the Rosaceae family, before arriving at the destination node representing the *Rubus* genus. Because the grower's input does not identify any species of the *Rubus* genus, there isn't sufficient information to select between lower nodes representing different species of *Rubus* plants, and therefore, the traversal may terminate at the *Rubus* node. However, had the grower identified *Rubus canadensis* in the natural language input, traversal of the agricultural knowledge graph may have continued for one additional hop to a node representing Canadian blackberries.

The selected destination node may provide access to phenotyping ML model(s) that provide inference(s) that are commensurate with a scope of the input. Continuing with the above language, the *Rubus* node may point to a memory location that stores one or more phenotyping ML models that, when used to process images, estimates a count of any type of *Rubus* berries. For example, one CNN may be used to annotate the image(s) with bounding boxes surrounding any *Rubus* berries. One or more other ML model(s) may estimate a count of all visible and occluded berries based on the bounding boxes in conjunction with other features, such as plant health, plant size, climate, agricultural management data, etc.

This example demonstrates how, in addition to selecting the destination node, the input may also dictate which ML model(s) of the destination node are ultimately applied. For instance, had the user requested "a health status of all *Rubus* plants," different phenotyping ML models accessible via the *Rubus* node may have been applied than in the berry count example. More generally, the input may be used to select both the destination node and to select from the phenotyping ML models accessible via the destination node.

Other types of input besides natural language input, such as sensor data and/or images of crops, may also be used to traverse through the knowledge graph until a suitable destination node is reached. For example, images of a crop may be processed using different phenotyping ML models at each level of the phenotypic taxonomy of nodes. The phenotypic inferences generated at each level may have associated confidence measures. Confidence measures may be compared to thresholds and/or across nodes at the same level of the phenotypic taxonomy of nodes to traverse the phenotypic taxonomy of nodes. Non-limiting factors that may impact these confidence measures include, for instance, features of the input data, such as its resolution, availability, fidelity, frequency of capture, comprehensiveness, etc.

In some instances, the phenotypic taxonomy of nodes may be traversed until confidence measures of phenotypic inference(s) generated at a particular node fail to satisfy a threshold. In such a scenario, a parent node or another node above the particular node—which may provide access to phenotyping ML model(s) that generate lower-specificity phenotypic inferences than ML model(s) of the particular node—may be selected as the destination node.

As a working example, phenotyping ML models of one or more higher-level nodes may generate phenotypic inferences that suggest, with sufficiently high confidence, that crops are infested with some type of fungus. However, lower-level nodes that provide access to phenotyping ML models trained to differentiate between different candidate fungal species may not generate sufficiently reliable phenotypic inferences. This may be because, for instance, another data point necessary to distinguish between fungi is unavailable or because the images are not of sufficient resolution. Consequently, a node above the level of nodes corresponding to the candidate fungi species may be selected as the destination node. While the grower may not be informed of the specific fungus species afflicting their crops, at least the grower is informed of a general fungal infestation, so that they can take remedial action.

As another example, when a higher-level node branches to two or more children nodes, one of the children nodes may be selected based on its phenotyping ML model(s) generating phenotypic inferences with greater confidence measures than its sibling nodes. Continuing with the working example above, if phenotyping ML model(s) of two fungal genus nodes generate phenotypic inferences with different confidence measures, the fungal genus node that is associated with the greater confidence measure may be selected, and traversal may continue from there (or that node may be selected as the destination node if further traversal is not possible).

It is not required that a user explicitly request phenotypic inference(s) to trigger traversal of the agricultural graph and application of phenotyping ML model(s). In some implementations, phenotypic inferences may be generated automatically based on and/or in response to other inputs and/or events, such as sensor data, images captured in the field, events such as heavy rain or drought, etc. These phenotypic inferences may then be provided downstream, e.g., as output(s) pushed to and surfaced by computing device(s) operated by users, and/or as signals that aid autonomous agricultural vehicles in navigating and/or performing agricultural tasks.

For example, as agricultural vehicles and/or robots gather vision data in the field, these vision data may be used automatically to traverse the phenotypic taxonomy of nodes of the agricultural knowledge graph and generate various phenotypic inferences as described above. If one or more of those inferences suggests presence of a pest or other malady, then traversal may continue until, for instance, confidence measures of phenotypic inferences fail to satisfy a threshold. At that point, a grower may be warned about the pest infestation with phenotypic inferences that are as specific as possible, given the fidelity of the data.

Implementations described herein give rise to various technical advantages. Enabling users to generate phenotypic inferences using structured and/or unstructured input without being constrained to existing frameworks frees the users from having to design and/or redesign (or have someone else design or redesign) a machine learning processing pipeline for each crop, crop cycle, field, etc. In some cases, all or parts of a phenotypic taxonomy of nodes can be selectively downloaded to or pushed to edge devices based on knowledge of the types of crops that are being grown at the end, enabling real-time phenotypic inferences at the edge. Techniques described herein also provide users with considerable flexibility about the scope of the phenotypic inferences they generate. If users wish to learn information about "berries" in general, the users can provide input that indicates as much (e.g., "Give me a count of all berries"). Alternatively, users can request more specific and/or granular information, at various levels or scopes, such as at the level of individual genuses or even individual species. Notably, users are freed from having to select, or even have knowledge of, which machine learning models are to be applied under any given scenario. Instead, the user may simply provide their intent, e.g., in the form of natural language input, and techniques described herein enable that intent to be carried out at a level of granularity that is commensurate with the user's input.

FIG. 1 schematically illustrates an environment in which one or more selected aspects of the present disclosure may be implemented, in accordance with various implementations. The example environment includes one or more agricultural plots 112 and various sensors that may be deployed at or near those areas, as well as other components that may be implemented elsewhere, in order to practice selected aspects of the present disclosure. Agricultural plots(s) 112 may be used to grow various types of crops that may produce plant parts of economic and/or nutritional interest. Agricultural plots(s) 112 may have various shapes and/or sizes. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

An individual (which in the current context may also be referred to as a "user" or "grower") may operate one or more client devices 106-1 to 106-X to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") 106-X that provides an AR or VR immersive computing experience, a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems. For example, plant knowledge system 104 may be implemented remotely from farms, e.g., by server(s) forming what is often referred to as the "cloud." Alternatively, plant knowledge system 104 may be implemented wholly or in part on "edge" computing device(s) that are near the "edge," e.g., local to the farms themselves, such as client devices 106-1 to 106-X or other computing devices/sensor packages described below.

Each client device 106 may operate a variety of different applications that may be used to perform various agricultural tasks, such as viewing and/or applying phenotypic inferences for various purposes, such as crop yield prediction, disease detection, pest detection, control of autonomous agricultural vehicles (e.g., robots), and so forth. For example, a first client device 106-1 operates agricultural ("AG") client 107 (e.g., which may be standalone or part of another application, such as part of a web browser). Another client device 106-X may take the form of an HMD that is configured to render 2D and/or 3D data to a wearer as part of a VR immersive computing experience. For example, the wearer of client device 106-X may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, one or more robots 108-1 to 108-M and/or other agricultural vehicles 109 may be deployed and/or operated to perform various agricultural tasks. These tasks may include, for instance, harvesting, irrigating, fertilizing, chemical application, trimming, pruning, sucker/bud removal, etc. An individual robot 108-1 to 108-M may take various forms, such as an unmanned aerial vehicle 108-1, a robot (not depicted) that is propelled along a wire, track, rail or other similar component that passes over and/or between crops, a wheeled robot 108-M, a rover that straddles a row of plants (e.g., so that the plant pass underneath the rover), or any other form of robot capable of being propelled or propelling itself past crops of interest.

In some implementations, different robots may have different roles, e.g., depending on their capabilities. For example, in some implementations, one or more of robots 108-1 to 108-M may be designed to capture and/or analyze various types of sensor data (e.g., vision, temperature, moisture, in situ soil sensor data). Others may be designed to extract samples of soil and/or plant matter, e.g., for ex situ analysis at a remote laboratory (also referred to as "grab" sampling). Yet others may be designed to manipulate plants or perform physical agricultural tasks. And some robots may do all three. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, lasers, barometers (for local weather information), photodiodes (e.g., for sunlight), thermometers, soil sensors, etc. This sensor data may be organized as structured agricultural data, e.g., in database(s) in accordance with known/consistent schemas, in spreadsheets, in organized textual files (e.g., comma-delimited, tab-delimited), etc.

In addition to or instead of robots, in some implementations, agricultural vehicles 109 such as the tractor depicted in FIG. 1, center pivots, boom sprayers (which may be affixed to tractors or other agricultural vehicles), threshers, etc. may be leveraged to acquire various sensor data. For example, one or more modular computing devices 111 (also referred to as "sensor packages") may be mounted to agricultural vehicle 109 and may be equipped with any number of sensors, such as one or more vision sensors that capture images of crops, or other sensors such as soil sensors, moisture sensors, thermometers, etc.

In various implementations, plant knowledge system 104 may be implemented across one or more computing systems, such as the cloud mentioned previously and/or one or more edge computing devices, such as client devices 106-1 to 106-X, robots 108-1 to 108-M, modular computing device(s) 111, etc. Plant knowledge system 104 may receive sensor data generated by robots 108-1 to 108-M, modular computing devices 111, and/or agricultural personnel and process it using various techniques to perform tasks such as making phenotypic predictions 122. In various implementations, plant knowledge system 104 may include an input data module 114, an agricultural knowledge graph (KG) navigation module 116, an inference module 118, and a training module 124. In some implementations one or more of modules 114, 116, 118, 124 may be omitted, combined, and/or implemented in a component that is separate from plant knowledge system 104.

Input data module 114 may be configured to obtain input from various sources, such as client device(s) 106, modular computing device(s) 111, robots 108-1 to 108-M, agricultural vehicle 109, databases of recorded agricultural data (e.g., logs), etc. As indicated by the arrows, input data module 114 may provide these input data to KG navigation module 116 and inference module 118. Plant knowledge system 104 may also include one or more databases. For example, plant knowledge system 104 may include, in communication with input data module 114, a database 115 for storing structured and/or unstructured agricultural data. Structured agricultural data may include any data that is collected and organized in a consistent and predictable manner. One example is sensor data collected by robots 108-1 to 108-M and/or other agricultural vehicles 109. Another example of structured agricultural data may be data that is input by agricultural personnel into spreadsheets, input forms, etc., such that the data is collected and organized, e.g., by input data module 114, in a consistent and/or predictable manner. For example, growers may maintain logs of how and/or when various management practices (e.g., irrigation, pesticide application, herbicide application, tillage) were performed. Other examples of structured agricultural data may include, for instance, satellite data, climate data from publicly available databases, and so forth.

Unstructured agricultural data may include any data that is collected from sources that are not organized in any consistent or predictable manner. These sources may include, for instance, natural language textual snippets obtained from a variety of sources. As one example, AG client 107 may provide an interface for a user 101 to record spoken utterances. These utterances may be stored as audio recordings, transcribed into text via a speech-to-text (STT) process and then stored, and/or encoded into embeddings and then stored. Other potential sources of natural language textual snippets include, but are not limited to, documents such as contracts and invoices, electronic correspondence (e.g., email, text messaging), periodicals such as newspapers (e.g., reporting floods or other weather events that can impact crops), and so forth. Documents may be obtained, e.g., by input data module 114, from sources such as a client device 106.

Plant knowledge system 104 may also include a machine learning model database 120 that includes a taxonomy of phenotyping machine learning (ML) models. In various implementations, each phenotyping ML model may be trained to generate one or more phenotypic inferences 122 at a level of specificity that corresponds to a level or rank of a phenotypic taxonomy. In some implementations, the phenotypic taxonomy may be hierarchal and may or may not be governed or provided, in whole or in part, by the International Code of Zoological Nomenclature, although this is not required. In this specification, the term "database" and "index" will be used broadly to refer to any collection of data. The data of the database and/or the index does not need to be structured in any particular way and it can be stored on storage devices in one or more geographic locations.

A KG database 117 may store data indicative of an agricultural KG (which will also be referred to herein using the reference numeral 117). In various implementations, the agricultural KG may include nodes representing agricultural entities and edges that represent relationships between those agricultural entities. An agricultural entity may include any person, place, thing, task, action, etc. that is relevant to the agricultural domain. Agricultural entities may be abstract or concrete. An abstract agricultural entity may correspond to a class, whereas a concrete agricultural entity may correspond to a particular instance of the class.

KG navigation module 116 may be configured to navigate/traverse through the agricultural KG stored in KG database 117 (117 will also be used to refer to the agricultural KG itself) based on input data received from input data module 114 and/or inferences received from inference module 118 to select appropriate phenotyping ML model(s) to be applied to input data in order to generate useful and/or timely phenotypic inferences 122. More particularly, but not exclusively, KG navigation module 116 may be configured to, based on input received from module 114, traverse the agricultural KG until a destination node is reached. In various implementations, the agricultural KG 117 may include a phenotypic taxonomy of nodes representing a taxonomic hierarchy of organisms. The destination node may correspond to a level of the phenotypic taxonomy of nodes that is commensurate in scope with the input, as will be explained further below. The phenotypic taxonomy of nodes may provide access to the taxonomy of phenotyping ML models mentioned previously. Thus, each phenotyping ML model may be trained to generate phenotypic inference(s) at a level of specificity that corresponds to a level (or rank) of the phenotypic taxonomy of nodes that contains the node that provides access to the phenotyping ML model.

Once KG navigation module 116 has traversed to one or more destination nodes and selected the corresponding phenotyping ML models, inference module 118 may process input data provided by input data module 114 using the selected phenotyping ML model(s) to generate output indicative of phenotypic prediction(s) 122. These phenotypic predictions may come in various forms, such as estimated aggregate traits of plots, crop yield, recommendations, visual annotations (e.g., bounding boxes or pixelwise image segmentation), and so forth. Various types of phenotyping ML models may be trained for use in performing selected aspects of the present disclosure. For example, a sequence encoder machine learning model such as an encoding portion of a transformer language model may be trained to generate semantically rich embeddings from unstructured agricultural data. Other types of phenotyping ML models, or ensembles of phenotypic models, may be trained to make phenotypic predictions based on structured agricultural data and semantically rich embeddings generated from unstructured agricultural data. These may include, for instance, various types of convolutional neural networks (CNNs), recurrent neural networks (RNNs), feed forward neural networks, support vector machines, transformers, decision trees, etc.

During one or more training phases, training module 124 may be configured to train any of the aforementioned ML models (or portions thereof) using ground truth and/or observed phenotypic traits. For example, training module 124 may train a sequence encoder machine learning model initially using a corpus of agricultural documents and data. In some implementations, training module 124 may train the sequence encoder machine learning model using similarity and/or metric learning techniques such as regression and/or classification similarity learning, ranking similarity learning, locality sensitive hashing, triplet loss, large margin nearest neighbor, etc.

In some implementations, training module 124 may also train phenotyping ML models to make phenotypic predictions. Suppose a particular agricultural plot 112 yields 1,000 units of a plant-trait-of-interest. Images of crops in that particular agricultural plot, captured sometime in the crop cycle prior to harvest, may be processed using a crop yield estimation machine learning model to predict crop yield. This predicted crop yield may then be compared, e.g., by training module 124, to the ground truth crop yield to determine an error. Based on this error, training module 124 may train one or more of the machine learning models in database 120, e.g., using techniques such as back propagation and gradient descent.

In some implementations, plant knowledge system 104 may also be configured, e.g., by way of KG navigation module 116, to provide portions of agricultural KG, including phenotypic ML models, to computing devices at or nearer the edge, such as client devices 106, robot(s) 108, and/or modular computing device(s) 111. By preemptively caching portion(s) of agricultural KG 117 in this way, these edge computing devices may be able to generate phenotypic inferences 122 in situ and/or in real time (or close to real time), without needing to wait for data to be uploaded to the cloud, or for KG navigation module 116 to navigate an entire agricultural KG 117, which may be massive. This may be particularly beneficial where these inferences 122 are used to control agricultural equipment, such as robots 108.

In some implementations, the portion(s) of agricultural KG 117 that are provided to the edge may be selected based on specific needs at the edge location (e.g., a particular farm). These needs may be determined in various ways, such as via natural language input (e.g., "I'm going to grow strawberries and raspberries in my fields"), contracts to grow particular crops, receipts identifying particular chemicals that suggest the presence of particular crops or classes of crops, etc. In some implementations, crop rotations may dictate which portion(s) of agricultural KG 117 are distributed to a given farm during a given crop cycle. For example, if strawberries are being grown in a given crop cycle, only portion(s) of agricultural KG 117 that are relevant to strawberries, such as potential pests, effective fertilizers, weeds known to be endemic to the area, etc., may be cached at the edge.

While various examples herein and subsequent figures depict phenotypic taxonomies of nodes as part of a larger knowledge graph, this is not meant to be limiting. In various implementations, the phenotypic taxonomy of nodes corresponding to the taxonomic hierarchy of organisms, as well as the ML model(s) made accessible via those nodes, may be implemented as a standalone data structure, without being part of, or even necessarily connected to, a larger knowledge graph. In such implementations, KG navigation module 116 may be replaced with a more general purpose graph navigation module, which may perform similar functions as described herein as being performed by KG navigation module 116, except on standalone phenotypic taxonomies of nodes, rather than a knowledge graph as a whole. Similarly, just as subparts of the entire knowledge graph can be deployed to edge devices to enable edge-based processing, in implementations in which phenotypic taxonomies of nodes are implemented as standalone data structures, all or portions of those structures may be distributed to edge computing nodes on demand or as needed.

Figure 2:
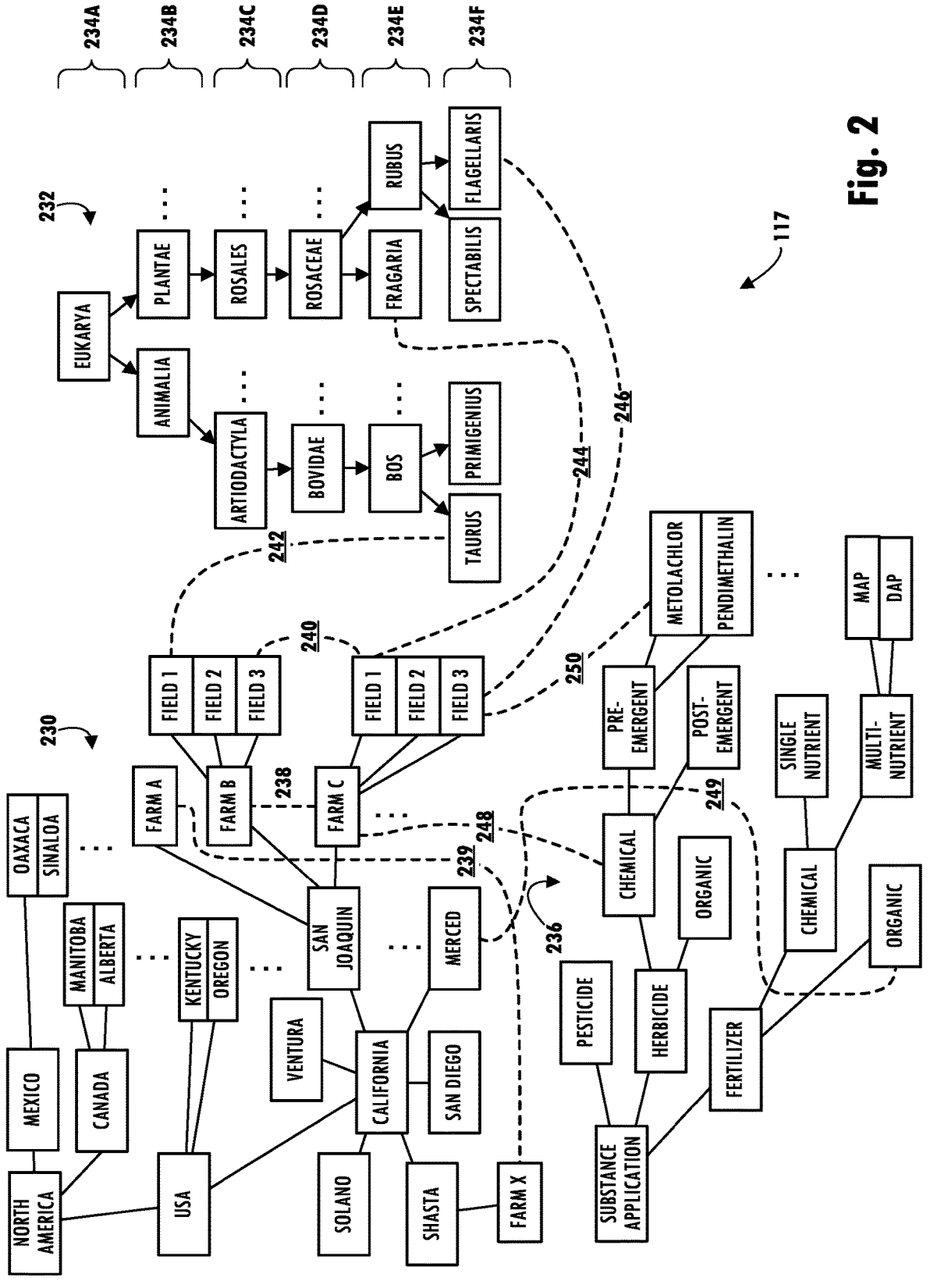
FIG. 2 schematically depicts an example agricultural knowledge graph, in accordance with various implementations.

FIG. 2 schematically depicts part of an example agricultural KG 117, in accordance with various implementations. The agricultural KG 117 depicted in FIG. 2 is for illustrative purposes only, is not meant to be comprehensive, and accordingly, should not be viewed as limiting in any way. Each rectangle in FIG. 2 comprises a node of agricultural KG 117 that represents an entity. Each edge represents a relationship between entities represented by the nodes it connects.

In this example, agricultural KG 117 includes a first portion indicated generally at 230 that represents locations, a second portion indicated generally at 232 that represents organisms, and a third portion indicated generally at 236 that represents agricultural tasks, in this case, application of substances such as pesticides, herbicides, and fertilizers. It should be understood that agricultural KG 117 may include other portions that represent other entities relevant to agriculture, such as agricultural equipment (e.g., robots, tractors, threshers, sprayers, cisterns), robots (e.g., 108-1 to 108-M), climate events (e.g., hurricanes, floods, draughts), stewardship events (e.g., instance of applied tillage, applied crop rotation), and so forth.

First portion 230 of agricultural KG 117 includes, at top left, a node representing North America. Although not shown, agricultural KG 117 may or may not include nodes representing the other continents of Earth. The North America node is connected to nodes representing Mexico, Canada, and the United States (USA). Each of those country nodes is, in turn, connected to nodes representing their various states. For instance, the USA node is connected to nodes representing California, Kentucky, and Oregon (and presumably nodes representing other states and territories of the USA). The California node is connected to nodes representing various California counties, such as Ventura, Solano, Shasta, San Diego, Merced, and San Joaquin, to name a few. Other states' nodes may or may not be similarly connected to county nodes.

The San Joaquin County node is connected to some number of nodes representing some number of farms or other agricultural centers in the San Joaquin County. In FIG. 2, for instance, the San Joaquin node is connected to nodes representing Farm A, Farm B, Farm, C, and so on. Each of these farm nodes may, in turn, be connected to node(s) representing individual agricultural fields or plots. For example, Farm B's node is connected to nodes representing fields 1-3. Similarly, Farm C's node is connected to nodes representing fields 1-3. As indicated by the various ellipses depicted in FIG. 2, it should be apparent that the various entities represented by the visible nodes are not intended to be limiting.

Various nodes of first portion 230 may be linked to each other in ways other than the solid lines depicted in FIG. 2, such as ad hoc relationships. For instance, nodes representing Farms B and C in San Joaquin County of California are connected by dashed edge 238 to indicate that these farms have a relationship beyond being located in the same county. For instance, edge 238 may represent the fact that these farms are proximate with each other, even sharing a border. Another edge 239 connecting Farm A in San Joaquin County with a Farm X in Shasta County may represent, for example, the fact that these two farms have the been designated as similar or identical Agroecological Zones ("AEZs," e.g., as provided by the Food and Agricultural Organization of the United Nations). Alternatively, nodes representing farms (or counties, or states, or individual fields/plots) having the same AEZ may be connected to a separate node representing that shared AEZ.

Second portion 232 of agricultural KG 117 comprises a phenotypic taxonomy of nodes representing a taxonomic hierarchy of organisms. The taxonomic hierarchy, and hence, phenotypic taxonomy of nodes (which will also be referred to herein with the reference numeral 232), is organized into multiple levels or ranks 234A-F. In this example, there are six ranks: 234A corresponding to domain; 234B corresponding to kingdom; 234C corresponding to order; 234D corresponding to family; 234E corresponding to genus, and 234F corresponding to species. However, this is not intended to be limiting, and other ranks, such as phylum, class, or various sub-categories of various ranks, may also be included. As will be explained with reference to FIG. 3, the nodes of phenotypic taxonomy of nodes 232 may provide access to phenotyping ML models, e.g., by linking or pointing to files or other data structure containing the weights of these phenotyping ML models.

Third portion 236 of agricultural KG 117 represents entities associated with the application of substances to agricultural areas. In FIG. 2 these substances may include pesticides, herbicides, and fertilizers, as indicated by the three nodes, but this is not intended to be limiting. FIG. 2 also demonstrates some subcategories or subclasses of these substances can be represented by additional nodes. For example, the node representing herbicide is connected to nodes representing chemical (or inorganic) herbicides and organic herbicides. The node representing chemical (or inorganic) herbicides is connected to nodes representing pre-emergent herbicides and post-emergent herbicides. The node representing pre-emergent herbicides is connected to nodes representing various types or classes of pre-emergent herbicides, such as metolachlor and pendimethalin, to name a few. The fertilizer node similarly is connected to levels of nodes separating fertilizers into chemical versus organic, as well as single nutrient versus multi-nutrient. And the multi-nutrient fertilizer node is connected to nodes representing monoammonium phosphate (MAP) and diammonium phosphate (DAP).

Other types of ad hoc relationships may be defined as part of agricultural KG 117, in addition to those described previously. For instance, an edge 240 is defined between Field 3 of Farm B in San Joaquin country and Field 1 of Farm C in the same county. This edge may specific, for instance, that these fields share a border. This may be consequential, for instance, because pests, diseases, weeds, or other phenomena that impact one of these fields may also impact (or be likely to impact) the other. Another edge 242 is defined between the node representing Field 1 of Farm B in San Joaquin County and a node representing the Taurus species (cattle) of phenotypic taxonomy of nodes 232. This may indicate that cattle are being, or have been, raised or allowed to graze in Field 1.

Another edge 244 connects the node representing Field 1 of Farm C in San Joaquin County and the node representing the *Fragaria* genus; this may represent an ad hoc relationship of strawberries and/or other species of that genus being grown, or having been grown, in that field. Yet another edge 246 is defined between the node representing Field 3 of Farm C in San Joaquin County and the node representing the *flagellaris* species of the *Rubus* genus. This may indicate that the northern dewberry is being, or has been, grown in Field 3. Yet another edge 248 is defined between the node representing Farm C of San Joaquin County and the node representing chemical herbicides. This may indicate that chemical herbicides, not organic, have been, are being, and/or will be applied to all fields of Farm C. Yet another edge 250 indicates that the pre-emergent metolachlor has been, is being, or will be applied to Field 3 of Farm C in San Joaquin County.

The ad hoc relationships represented by edges 238-250 in FIG. 2 may be created in various ways. In some implementations, they may be created manually, e.g., by operating a graphical user interface (GUI) to draw edges between the various nodes. Additionally or alternatively, these relationships may be defined using database records/fields. In some implementations, these edges may be created based on natural language input. For instance, a grower of Farm C in San Joaquin County may utter the statement, "I'm only going to use chemical herbicides in Field 3." This utterance may be speech-to-text (STT) processed to generate text, which may then be analyzed using natural language processing. The result of the natural language processing may be used to generate edge 248. Other sources of natural language may include, for instance, contracts, correspondence, regulations, etc. For example, if a regulation is issued that requires all strawberry farms in Merced County, California to use only organic fertilizers, that regulation may be natural language processed to generate an edge 249 between the node representing organic fertilizer and the node representing Merced County.

Figure 3:
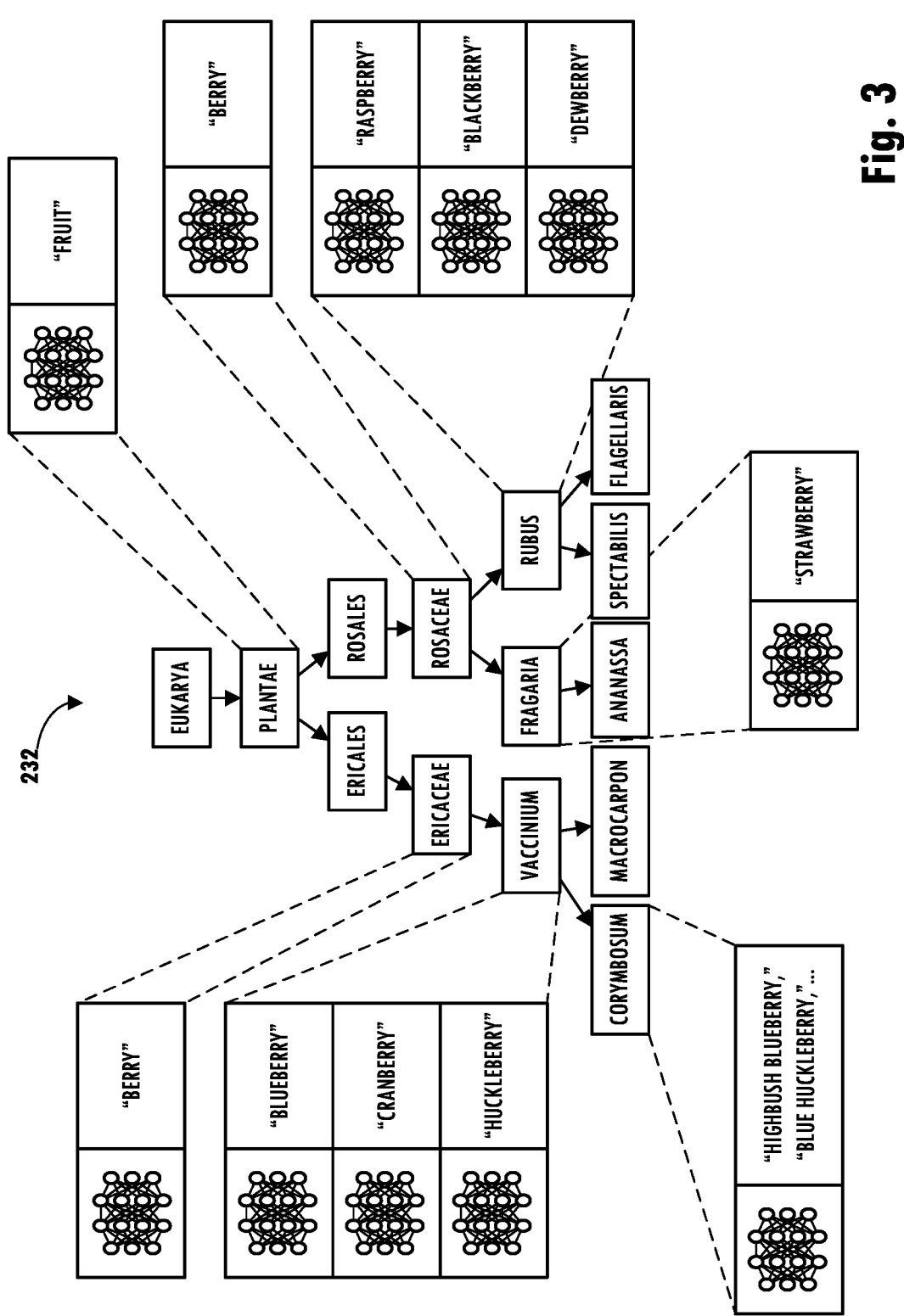
FIG. 3 schematically depicts an example of how phenotyping ML models may be accessible via nodes of a taxonomy of nodes, in accordance with various implementations.

FIG. 3 schematically depicts second portion 232 of agricultural KG 117, which includes a phenotypic taxonomy of nodes representing a taxonomic hierarchy of organisms. The taxonomy indicated at 232 is not intended to be limiting, and there can, and likely would be, myriad additional nodes not depicted in FIGS. 2-3. For example, in FIG. 3, the entire Animalia kingdom has been omitted because the discussion that follows will be focused on the Plantae kingdom.

Various call-out boxes are depicted in FIG. 3 extending from various nodes. Each call-out box includes, on the left, a distinct phenotyping ML model that is accessible by the corresponding node. While only one phenotyping ML model is depicted in each node, this is not intended to be limiting; each node may or may not provide access to multiple phenotyping ML models. On the right of each call-out box, one or more keywords or concepts are provided that navigation module 116 may use to navigate agricultural KG 117 generally, and second portion 232 of agricultural KG in particular, until one or more suitable destination nodes are reached. The destination node may correspond to a level of the phenotypic taxonomy of nodes that is commensurate in scope with whatever input is provided. As noted previously, this input may include various structured and/or unstructured agricultural data, such as natural language input (unstructured), sensor data, images depicted crops, weather data, stewardship data (e.g., logs of agricultural tasks performed), and so forth.

As an example, suppose a count of "fruit" is requested in a particular agricultural plot. "Fruit" is a relatively broad concept. Depending on the ontolog(ies) in use, "fruit" may encompass a wide variety of plant-parts-of-interest that are colloquially referred to as "fruit," regardless of whether they qualify officially as botanical fruit, such as berries, flowers, nuts, vegetables, and so forth. Accordingly, the node representing the entire Plantae kingdom may be associated with a phenotyping ML model that is trained to detect instances of any type of fruit (officially or colloquially) in digital imagery depicting crops.

A "fruit" phenotyping ML model, which in many cases may include one or more CNNs, may be trained using training data that includes labeled instances of different types of fruits. For instance, labeled images of bananas may be included alongside labeled images of apples, strawberries, raspberries, tomatoes, etc. In some implementations, these labels may identify the individual instances generally as "fruit." In other implementations where instances are labeled more granularly as specific types of fruits, an enumerated list of concepts that are deemed to qualify as "fruit" (e.g., a mapping of multiple different types of fruit to the general concept of "fruit") may be provided, so that any instance labeled as a specific type of fruit may be generalized to "fruit" for purposes of training the "fruit" phenotyping ML model.

While the "fruit" concept is shown as being associated with the Plantae kingdom node in FIG. 3, this is not meant to be limiting. In other implementations, two or more nodes on lower level or taxonomic rank(s) beneath the Plantae kingdom that represent (directly or generally) species with plant-parts-of-interest deemed "fruit" (colloquially and/or officially) may each be associated with its own distinct "fruit" phenotyping ML model that is trained to detect those fruit.

An example of this is depicted in FIG. 3, where two separate call-out boxes for the concept of "berry" are depicted as being associated with two different nodes. One call-out box on the right is associated with the node representing the Rosaceae family, which includes the genus *Fragaria* and the genus *Rubus* (raspberries, blackberries, etc.). The phenotyping ML models associated with this node may be trained to detect any plant-part-of-interest considered a "berry" (officially or colloquially) under either of these Genera, including strawberries, raspberries, blackberries, etc. Another call-out box on the left is associated with the node representing the Ericaceae family, which includes the genus *Vaccinium*. As before, the phenotyping ML models associated with this node may be trained to detect any plant-part-of-interest considered a "berry" (officially or colloquially) under the *Vaccinium* genus (or any other genus beneath the Ericaceae family), such as blueberries, cranberries, huckleberries, etc.

Should a user provide input requesting phenotypic inferences about the concept "berry" or "berries," KG navigation module 116 may traverse second portion 232 of agricultural KG 117 until it reaches the nodes representing the Rosaceae and Ericaceae families. At that point, KG navigation module 116 may select, and inference module 118 may apply, phenotyping ML models that are accessible via both nodes to the input (e.g., to digital images depicting crops) to generate phenotypic inferences, such as detected instances of berries, berry counts, crop yield projections, etc. In some implementations, phenotypic inferences generated from multiple different phenotyping ML models may be combined to yield a combined inference. For example, if a berry count is requested and multiple different phenotyping ML models are applied to estimate counts of different types of berries, these different count estimates may be combined, e.g., using addition.

As another example, the node representing the *Vaccinium* genus is depicted as being associated with three more specific concepts, "blueberry," "cranberry," and "huckleberry." Should a user provide input requesting phenotypic inferences about any of these concepts, e.g., as a keyword in a spoken utterance, KG navigation module 116 may traverse second portion 232 of agricultural KG 117 until it reaches the node representing the *Vaccinium* genus. At that point, KG navigation module 116 may select, and inference module 118 may apply, whichever phenotyping ML model(s) that match the concept found in the user's input.

Similarly, the node representing the *Fragaria* genus is depicted as being associated with the concept, "strawberry." Should a user provide input requesting phenotypic inferences about "strawberries," e.g., as a keyword in a spoken utterance, KG navigation module 116 may traverse second portion 232 of agricultural KG 117 until it reaches the node representing the *Fragaria* genus. At that point, KG navigation module 116 may select, and inference module 118 may apply, one or more phenotyping ML models provided by the *Fragaria* genus node.

As yet another example, the node representing the *Rubus* genus is depicted as being associated with three more specific concepts, "raspberry," "blackberry," and "dewberry," which are not officially considered botanical berries but are colloquially known as "berries." Should a user provide input requesting phenotypic inferences about any of these concepts, e.g., as a keyword in a spoken utterance, KG navigation module 116 may traverse second portion 232 of agricultural KG 117 until it reaches the node representing the Rubs genus. At that point, KG navigation module 116 may select, and inference module 118 may apply, whichever phenotyping ML model(s) that match the concept found in the user's input.

If a user wishes to identify a particular species, the user need only to provide input that identifies the particular species. KG navigation module 116 may traverse second portion 232 of agricultural KG 117 until it reaches a node at a level of the taxonomic hierarchy that is commensurate in scope with the user's input, namely, the identified species. In FIG. 3, for instance, the node representing the *Vaccinium corymbosum* species, is depicted in association with a callout box that includes different terms for this species, "highbush blueberry" and "blue huckleberry." The corresponding phenotyping ML model may be trained using images that include labeled instances of this specific type of blueberry.

Figure 4:
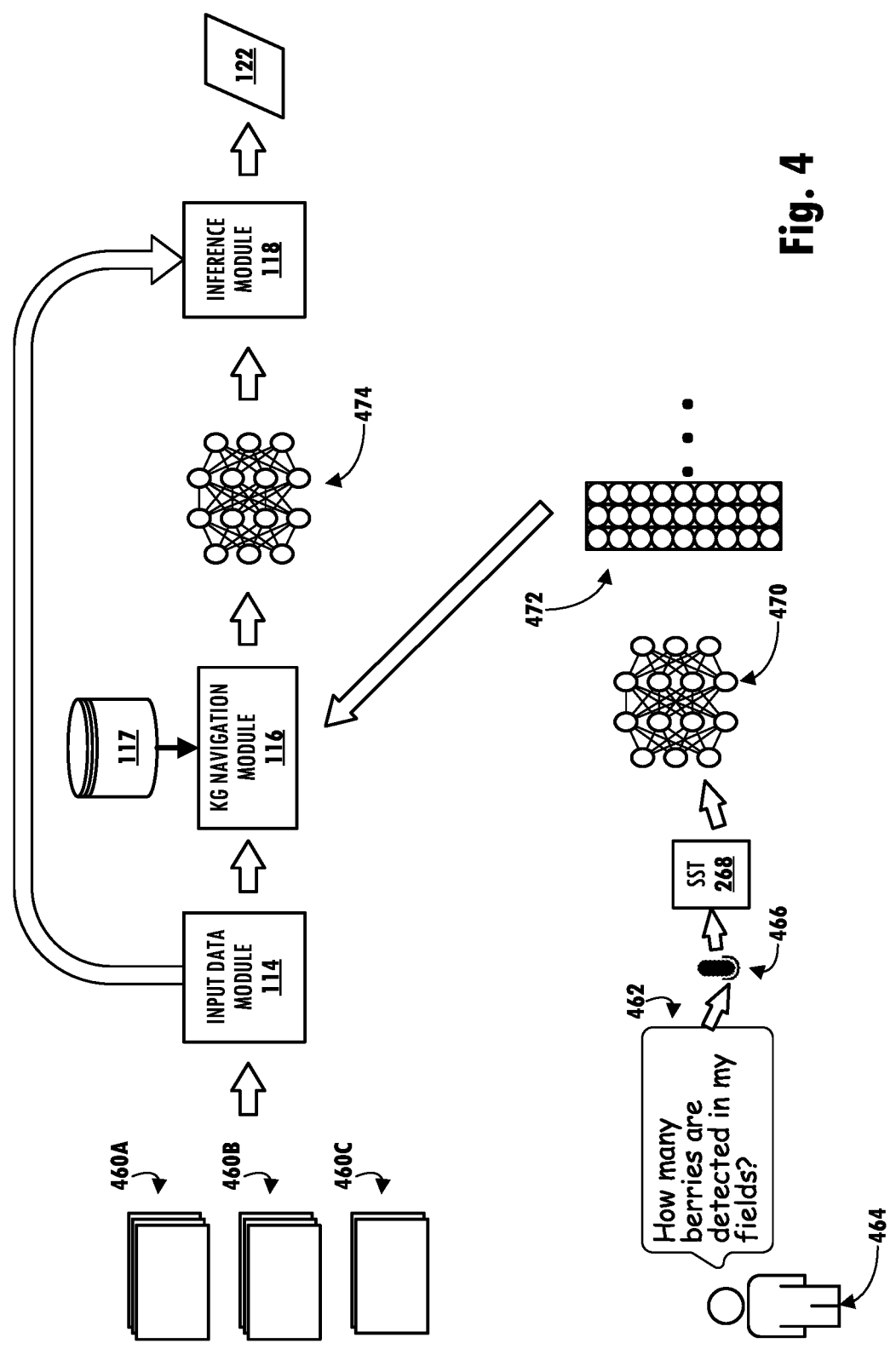
FIG. 4 schematically depicts an example of how techniques described herein may be implemented to process input data and generate phenotypic inferences.

FIG. 4 schematically depicts an example of how techniques described herein may be used to process input and to generate phenotypic inferences. At bottom left, a user 464 speaks the utterance 462, "How many berries are detected in my fields?" The utterance 462 is captured at a microphone 466, e.g., integral with a client device 106. The recording is then processed by a STT module 268 to generate textual output. The textual output is processed using a natural language processing ML model 470 (e.g., encoder-decoder, transformer, Word2Vec, etc.) to generate a semantic embedding 472. This semantic embedding 472 may in turn be provided to or retrieved by KG navigation module 116.

Meanwhile, additional input may be provided, e.g., by input module data module 114 to KG navigation module 116. In FIG. 4, this additional input includes three sets of images, 460A, 460B, and 460C, which may have been captured by robots (e.g., 108) and/or sensor packages (e.g., 111) that are carried through three different agricultural plots. First set of images 460A may include, for instance, images captured in a first agricultural plot in which a grower planted raspberries. Second set of images 460B may include, for instance, images captured in a second agricultural plot in which the grower planted blueberries. And third set of images 460C may include, for instance, images captured in a third agricultural plot in which a grower planted strawberries. In some implementations, input data module 114 may preprocess images 460A-C before providing downstream components with data. For example, input data module 114 may perform feature extraction, e.g., using one or more CNNs or other ML models, to generate reduced dimensionality embeddings of those images. Although not shown in FIG. 4, other data besides images 460A-C may also be processed, such as other sensor data collected in the field (e.g., soil sensor data, moisture data), weather data, stewardship data, etc.

KG navigation module 116 may process whatever input it receives, such as semantic embedding 472 and/or data indicative of images 460A-C that is provided by input data module 114 (and other input, if applicable). Based on this processing, KG navigation module 116 may traverse agricultural KG 117 until it reaches one or more suitable destination nodes. The suitable destination node(s) may correspond to level(s) of the phenotypic taxonomy of nodes (e.g., second portion 232 of agricultural KG 117 depicted in FIGS. 2-3) that is commensurate in scope with the input. In this example, user 464 explicitly requested phenotypic inferences about a particular concept, "berries." Consequently, and referring to both FIGS. 3 and 4, KG navigation module 116 may traverse second portion 232 of agricultural KG 117 until it reaches the Ericaceae and Rosacea nodes. At that point, KG navigation module 116 may select one or more phenotyping ML models 474 and provide them to inference module 118. Inference module 118 may then process data indicate of images 460A-C using the selected phenotyping ML models 474 to generate phenotypic inference(s) 122.

Explicit user input is not required to generate phenotypic inferences 122. In fact, user 464 may not even need to request phenotypic inferences 122 at all. In some implementations, images 460A-C may be processed automatically (e.g., periodically, in response to being uploaded to the cloud, in response to being captured locally, etc.) to generate phenotypic inferences that are as specific or granular as possible given various factors, such as the quality of the image(s), image resolution, accuracy of the phenotyping ML model(s), confidence scores associated with the phenotypic inferences, etc. These automatic and/or unsolicited phenotypic inferences may then be pushed to user(s), automatically or selectively based on various criteria, and surfaced as audible and/or visual output.

As a working example, assume that images of a particular crop field are captured by robot(s) 108 and/or modular sensor package(s) 111, e.g., while those vehicles perform routine agricultural tasks such as irrigation, fertilizer application, tilling, or simply patrolling the field. These images and/or data indicative thereof (e.g., reduced-dimensionality embeddings) may be processed by KG navigation module 116 and inference module 118 automatically to generate various phenotypic inferences at various levels of specificity. Depending on the various factors mentioned previously, confidence scores of these phenotypic inferences may vary.

Suppose the crop field is used to grow strawberries, and that the strawberry plants are being damaged by slugs. Images captured of the crop field may be processed using phenotyping ML models associated with nodes at multiple different levels of the second portion 232 of agricultural KG 117. At the outset, a node representing the Invertebrates taxonomic class may provide access to a phenotyping ML model that is trained to broadly detect (e.g., annotate with a bounding box or pixel-wise segment) instances of any potential agricultural pests. Any detected slugs, along with any other invertebrates that are detected, may be flagged. While these annotated images may be somewhat useful, more specific phenotypic inferences may be more helpful for planning remedial action.

At a lower taxonomic level/rank, a node representing the phylum Mollusca may provide access to a phenotyping ML model that is trained to detect instances of agricultural pests that qualify as mollusks, such as slugs, limpets, snails, etc. These more specific phenotypic inferences may be more useful to a grower because the grower may be able to make a more targeted decision regarding remediation. At even lower taxonomic ranks, nodes representing more specific categories of mollusks, such as a node representing the Gastropoda class, or genera and/or species within, may provide access to phenotyping ML models that are trained at increasingly granular levels to detect instances of specific types of slugs.

The images of the crop field may be processed at each layer, e.g., by inference module 118, to generate increasingly specific phenotypic inferences. In some implementations, these phenotypic inferences may be assigned confidence measures, e.g., by inference module 118. In various implementations, these confidence measures may be compared, e.g., by KG navigation module 116, to other confidence measures associated with other phenotypic inferences and/or with thresholds. Based on these comparisons, KG navigation module 116 may select appropriate destination node(s), and hence, select the phenotyping ML model(s) from which phenotypic inferences can be trusted. Those inference may then be pushed to the grower, e.g., directly or indirectly as recommendations. In the working slug infestation example, for instance, a grower may be informed that their strawberries are infested with slugs (at as much granularity as possible), and/or may be provided recommendations for remedial action, such as pesticides, or other treatments to remediate slugs.

FIG. 5 illustrates a flowchart of an example method 500 for practicing selected aspects of the present disclosure during an inference phase. The operations of FIG. 5 can be performed by one or more processors, such as one or more processors of the various computing devices/systems described herein, such as by plant knowledge system 105. For convenience, operations of method 500 are described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

At block 502, the system, e.g., by way of input data module 114, may receive input that includes one or more images of crops growing in an agricultural plot. This input may or may not include explicit input from a user. For example, a user may issue a natural language request (e.g., "What is my estimated soybean yield?") or operate a GUI to request agricultural inferences. Alternatively, the input may only include the images and/or other sensor data that is collected during routine agricultural operations, e.g., by robots and/or modular computing devices mounted to agricultural vehicles.

Based on the input received at block 502, at block 504, the system, e.g., by way of KG navigation module 116, may traverse an agricultural KG (e.g., 117) until a destination node is reached. As noted previously, the agricultural knowledge graph may include a phenotypic taxonomy of nodes (e.g., 232) representing a taxonomic hierarchy of organisms, and the phenotypic taxonomy of nodes may provide access to a corresponding taxonomy of phenotyping ML models. Each phenotyping ML model may be trained to generate phenotypic inference(s) at a level of specificity that corresponds to a level of the phenotypic taxonomy of nodes that contains the node that provides access to the phenotyping ML model.

The destination node may correspond to a level of the phenotypic taxonomy of nodes that is commensurate in scope with the input. In some implementations, at block 506, the system may select the destination node based on natural language input having a scope that matches the level of the phenotypic taxonomy of nodes that contains the destination node. For example, if the user requests phenotypic inferences about "fruit," one or more destination nodes may be selected that provide access to phenotyping ML models that are trained to generate inferences relating generally to "fruit."

Additionally or alternatively, at block 508, the system, e.g., by way of KG navigation module 116 and/or inference module 118, may automatically (e.g., without explicit user instruction) process the crop image(s) using phenotypic ML model(s) accessible via the phenotypic taxonomy of nodes to generate phenotypic inference(s) about the agricultural plot, as well as confidence measure(s) of those inferences. At block 510, the system, e.g., by way of KG navigation module 116 and/or inference module 118, may select the destination node based on those confidence measures.

As part of block 510, in some implementations, KG navigation module 116 may select destination nodes at various levels by comparing cross-level confidence measures and/or by comparing confidence measures generated at different levels to thresholds. For instance, inference module 118 may process the crop image(s) using phenotyping ML model(s) that are accessible via one or more of the phenotypic taxonomy of nodes below the destination node to generate one or more higher-specificity phenotypic inferences about the agricultural plot. Inference module 118 and/or KG navigation module 116 may then determine that one or more confidence measures associated with one or more of the higher-specificity phenotypic inferences fails to satisfy a threshold, and select the destination node.

Additionally or alternatively, as part of block 510, the system may select between two sibling nodes to determine which phenotyping ML models to apply and/or which edges of agricultural KG 117 to traverse. For instance, inference module 118 may process the one or more images of crops using two or more of the phenotyping ML models that are accessible via two or more of the phenotypic taxonomy of nodes above the destination node to generate lower-specificity phenotypic inferences about the agricultural plot. KG navigation module 116 may then compare confidence measures associated with the lower-specificity phenotypic inferences and traverse the agricultural knowledge graph based at least in part on the comparing.

At block 512, the system, e.g., by way of inference module 118, may process the one or more images of crops using phenotyping ML model(s) that are accessible via the destination node. Based on the processing at block 512, at block 514, the system may generate one or more phenotypic inferences about the agricultural plot. The system may perform various operations using these phenotypic inferences. At block 516, for instance, the system may operate, or cause to operate, one or more agricultural vehicles based on the inferences. For example, detected pests may be eradicated by agricultural robot(s) 108. Autonomous irrigation sprayers may be operated automatically to irrigate crops that are detected to be dehydrated. Alternatively, at block 518, the system may provide audible and/or visual output indicative of the phenotypic inferences to a user. For example, a grower may be provided with a report and/or map showing locations in the agricultural plot at which particular inferences were made, and at which corresponding agricultural tasks should be performed.

Figure 6:
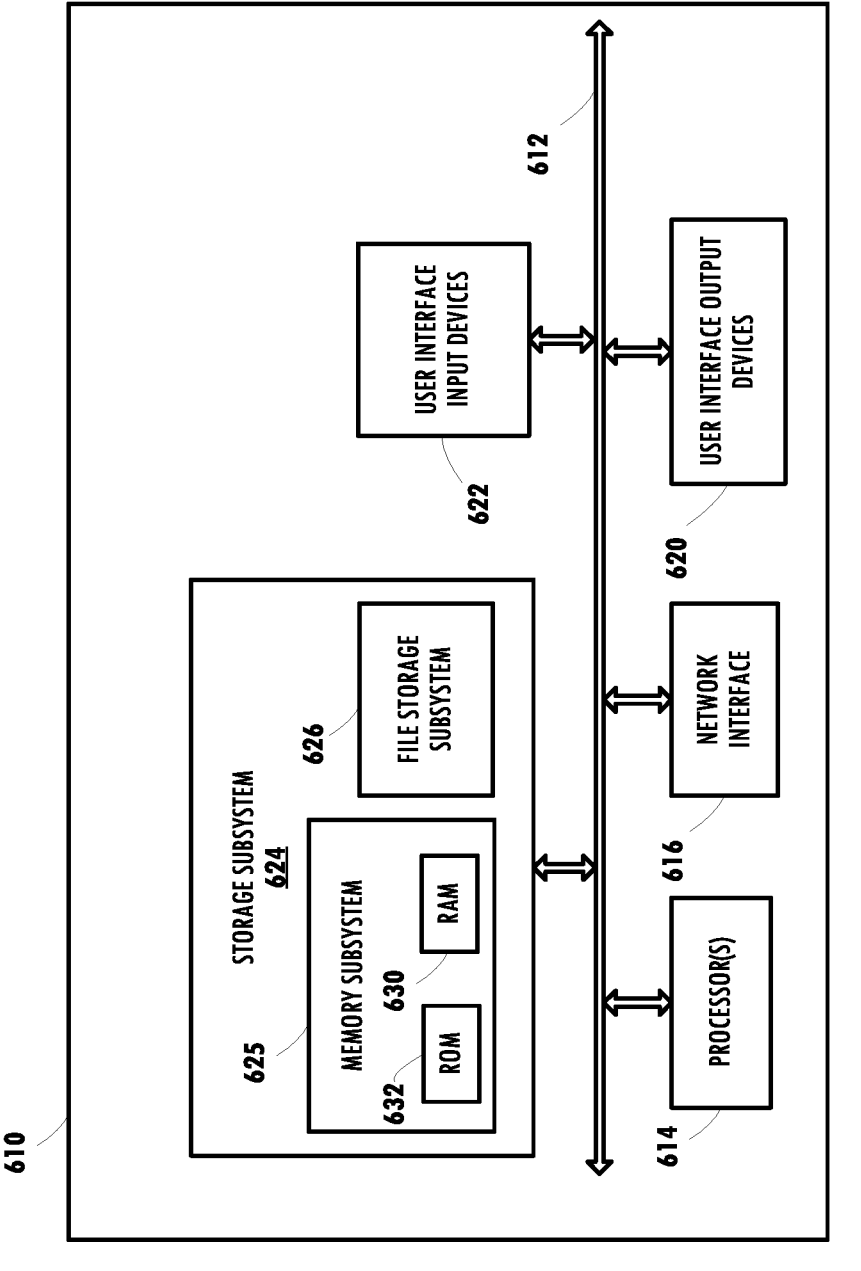
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 500 described herein, as well as to implement various components depicted in FIGS. 1-4.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, the method comprising:

receiving input that includes one or more images of crops growing in an agricultural plot;

based on the input, traversing an agricultural knowledge graph until a destination node is reached, wherein:

the agricultural knowledge graph includes a phenotypic taxonomy of nodes representing a taxonomic hierarchy of organisms;

the destination node corresponds to a level of the phenotypic taxonomy of nodes that is commensurate in scope with the input; and the phenotypic taxonomy of nodes provide access to a corresponding taxonomy of phenotyping machine learning (ML) models, wherein each phenotyping ML model is trained to generate one or more phenotypic inferences at a level of specificity that corresponds to a level of the phenotypic taxonomy of nodes that contains a respective node that provides access to a respective phenotyping ML model;

processing the one or more images of crops using a first phenotyping ML model that is accessible via the destination node, the processing using the first phenotyping ML model to produce a first phenotypic inference about the agricultural plot;

processing the one or more images of crops using a second phenotyping ML model that is accessible via a node below the destination node, the processing using the second phenotyping ML model to produce a second phenotypic inference about the agricultural plot, the second phenotypic inference including at least one confidence measure associated with an output of the second phenotyping ML model;

determining that the at least one confidence measure included in the output of the processing of the second phenotyping ML model fails to satisfy a threshold;

selecting the destination node based on a failure of the at least one confidence measure associated with the output of the processing of the second phenotyping ML model fails to satisfy the threshold;

based on a selection of the destination node, output the first phenotypic inference generated based on the first phenotyping ML model; and causing an agricultural operation to be performed based on the first phenotypic inference, wherein the causing of the agricultural operation to be performed on the crops of the one or more images includes deploying a robot to perform a harvesting operation on the crops of the one or more images.

2. The method of claim 1, further including operating one or more agricultural vehicles in the agricultural plot in real time based on the first phenotypic inference about the agricultural plot.

3. The method of claim 1, wherein the one or more of the phenotypic inferences about the agricultural plot includes an instance count of edible plant matter.

4. The method of claim 1, wherein the destination node points to a memory location that stores the phenotyping ML model.

5. The method of claim 1, wherein the input includes natural language input, and the traversing includes selecting the destination node based on the natural language input having a scope that matches the level of the phenotypic taxonomy of nodes that contains the destination node.

6. The method of claim 5, wherein the selecting is based on the natural language input identifying a taxonomic rank of the destination node.

7. The method of claim 1, further including:
   processing the one or more images of crops using a third phenotyping ML model and a fourth phenotyping ML model that are accessible via two or more of the phenotypic taxonomy of nodes above the destination node to generate lower-specificity phenotypic inferences about the agricultural plot;
   comparing respective confidence measures associated with outputs of the lower-specificity phenotypic inferences; and
   traversing the agricultural knowledge graph based at least in part on the comparison of the respective confidence measures.

8. The method of claim 1, wherein the input is received from an autonomous vehicle operating in the agricultural plot, and the method further includes providing data indicative of one or more of the phenotypic inferences about the agricultural plot to a computing device operated by a user associated with the agricultural plot, wherein the providing causes the computing device to surface the data.

9. The method of claim 1, wherein the robot is to perform an irrigation operation on the crops of the one or more images.

10. The method of claim 1, wherein the robot is to perform a trimming operation on the crops of the one or more images.

11. A system comprising one or more processors and memory storing instructions that, in response to execution by the one or more processors, cause the one or more processors to:
   receive input that includes one or more images of crops growing in an agricultural plot;
   based on the input, traverse an agricultural knowledge graph until a destination node is reached, wherein:
      the agricultural knowledge graph includes a phenotypic taxonomy of nodes representing a taxonomic hierarchy of organisms;
      the destination node corresponds to a level of the phenotypic taxonomy of nodes that is commensurate in scope with the input; and
      the phenotypic taxonomy of nodes provide access to a corresponding taxonomy of phenotyping machine learning (ML) models, wherein each phenotyping ML model is trained to generate one or more phenotypic inferences at a level of specificity that corresponds to a level of the phenotypic taxonomy of nodes that contains a respective node that provides access to a respective phenotyping ML model;
   process the one or more images of crops using a first phenotyping ML model that is accessible via the destination node, the processing using the first phenotyping ML model to produce a first phenotypic inference about the agricultural plot;
   process the one or more images of crops using a second phenotyping ML model that is accessible via a node below the destination node to generate a second phenotypic inference about the agricultural plot, the second phenotypic inference including at least one confidence measure associated with an output of the second phenotyping ML model;
   determine that the at least one confidence measure included in the output of the processing of the second phenotyping ML model fails to satisfy a threshold;
   select the destination node based on a failure of the at least one confidence measure associated with the output of the processing of the second phenotyping ML model to satisfy the threshold;
   based on a selection of the destination node, output the first phenotypic inference generated based on the first phenotyping ML model; and
   cause an agricultural operation to be performed based on the first phenotypic inference, wherein to cause the agricultural operation to be performed on the crops of the one or more images includes to deploy a robot to perform a harvesting operation on the crops of the one or more images.

12. The system of claim 11, wherein the instructions cause the one or more processors to operate one or more agricultural vehicles in the agricultural plot in real time based on the first phenotypic inference about the agricultural plot.

13. The system of claim 11, wherein the one or more of the phenotypic inferences about the agricultural plot includes an instance count of edible plant matter.

14. The system of claim 11, wherein the destination node points to a memory location that stores the phenotyping ML model.

15. The system of claim 11, wherein the input includes natural language input, and the instructions to traverse include instructions to select the destination node based on the natural language input having a scope that matches the level of the phenotypic taxonomy of nodes that contains the destination node.

16. The system of claim 15, wherein the destination node is selected is based on the natural language input identifying a taxonomic rank of the destination node.

17. The system of claim 11, wherein the instructions cause the one or more processors to:
   process the one or more images of crops using a third phenotyping ML model and a fourth phenotyping ML model that are accessible via two or more of the phenotypic taxonomy of nodes above the destination node to generate lower-specificity phenotypic inferences about the agricultural plot;
   compare respective confidence measures associated with outputs of the lower-specificity phenotypic inferences; and
   traverse the agricultural knowledge graph based at least in part on the comparison of the respective confidence measures.

18. The system of claim 11, wherein the input is received from an autonomous vehicle operating in the agricultural plot, and the instructions include instructions to provide data indicative of one or more of the phenotypic inferences about the agricultural plot to a computing device operated by a user associated with the agricultural plot, wherein the providing causes the computing device to surface the data.

19. At least one non-transitory computer-readable medium comprising instructions that, when executed by one or more processors, cause the one or more processors to:

receive input that includes one or more images of crops growing in an agricultural plot;

based on the input, traverse an agricultural knowledge graph until a destination node is reached, wherein:

the agricultural knowledge graph includes a phenotypic taxonomy of nodes representing a taxonomic hierarchy of organisms;

the destination node corresponds to a level of the phenotypic taxonomy of nodes that is commensurate in scope with the input; and the phenotypic taxonomy of nodes provide access to a corresponding taxonomy of phenotyping machine learning (ML) models, wherein each phenotyping ML model is trained to generate one or more phenotypic inferences at a level of specificity that corresponds to a level of a corresponding phenotypic taxonomy of nodes that contains a respective node that provides access to a respective phenotyping ML model;

process the one or more images of crops using a first phenotyping ML model that is accessible via the destination node, the processing using the first phenotyping ML model to produce a first phenotypic inference about the agricultural plot;

process the one or more images of crops using a second phenotyping ML model that is accessible via a node below the destination node to generate a second phenotypic inference about the agricultural plot, the second phenotypic inference including at least one confidence measure associated with an output of the second phenotyping ML model;

determine that the at least one confidence measure included in the output of the processing of the second phenotyping ML model fails to satisfy a threshold;

select the destination node based on a failure of the at least one confidence measure associated with the output of the processing of the second phenotyping ML model to satisfy the threshold;

based on the selection of the destination node, output the first phenotypic inference generated based on the first phenotyping ML model; and cause an agricultural operation to be performed based on the first phenotypic inference, wherein the causing the agricultural operation to be performed on the crops of the one or more images includes deploying a robot to perform a harvesting operation on the crops of the one or more images.

20. The at least one non-transitory computer-readable medium of claim 19, wherein the instructions cause the one or more processors to operate one or more agricultural vehicles in the agricultural plot in real time based on the first phenotypic inference about the agricultural plot.

* * * * *